United States Patent
Peltz et al.

(10) Patent No.: US 8,646,326 B2
(45) Date of Patent: Feb. 11, 2014

(54) PAINT SWATCH TEST DEVICE AND METHOD

(75) Inventors: Jamie B. Peltz, Orange Village, OH (US); Robert F. Golownia, Hudson, OH (US)

(73) Assignee: True Hue, LLC, Orange Village, OH (US)

( * ) Notice: Subject to any disclaimer, the term of this patent is extended or adjusted under 35 U.S.C. 154(b) by 58 days.

(21) Appl. No.: 13/191,812

(22) Filed: Jul. 27, 2011

(65) Prior Publication Data

US 2012/0031540 A1 Feb. 9, 2012

Related U.S. Application Data

(60) Provisional application No. 61/370,644, filed on Aug. 4, 2010.

(51) Int. Cl.
*G01N 33/32* (2006.01)
*B32B 33/00* (2006.01)

(52) U.S. Cl.
USPC ......... 73/150 R; 73/866; 428/40.1; 428/41.6; 428/41.8; 156/64

(58) Field of Classification Search
USPC ............................... 73/150 R, 866
See application file for complete search history.

(56) References Cited

U.S. PATENT DOCUMENTS

| | | | |
|---|---|---|---|
| 2,884,715 A | 5/1959 | Hadley | |
| 3,995,924 A | 12/1976 | Jones | |
| 4,061,521 A | 12/1977 | Lerner et al. | |
| 4,379,696 A * | 4/1983 | Lerner | 434/98 |
| 4,457,718 A * | 7/1984 | Lerner | 434/98 |
| 4,546,007 A | 10/1985 | Abe et al. | |
| 5,174,758 A * | 12/1992 | Abramson | 434/98 |
| 5,217,377 A * | 6/1993 | Little, Jr. | 434/103 |
| 5,217,744 A | 6/1993 | Little, Jr. | |
| 5,700,515 A | 12/1997 | Rodrigues | |
| 6,112,665 A * | 9/2000 | Teter et al. | 101/483 |
| 6,416,612 B1 * | 7/2002 | Lerner et al. | 156/277 |
| 6,790,042 B2 * | 9/2004 | Worth | 434/75 |
| 6,857,875 B1 * | 2/2005 | McClure | 434/81 |
| 6,994,553 B2 * | 2/2006 | DaRif et al. | 434/98 |
| 7,005,171 B2 * | 2/2006 | Lerner et al. | 428/41.8 |
| 7,014,466 B2 * | 3/2006 | Cojic et al. | 434/105 |
| 7,914,285 B2 * | 3/2011 | Boney | 434/72 |

(Continued)

FOREIGN PATENT DOCUMENTS

WO     00/08426 A1     2/2000

*Primary Examiner* — Leonard Chang
*Assistant Examiner* — Natalie Huls
(74) *Attorney, Agent, or Firm* — Pearne & Gordon LLP

(57) ABSTRACT

A paint swatch test device includes a transparent or translucent substrate, such as a sheet of polymeric material, and a plurality of different primer coating patches on the substrate. The patches preferably form a grayscale series of neutral white and gray primer patches having stepwise increments in light reflectance values. The patches can also be provided on an opaque substrate. The color suitability and/or hiding power of a topcoat paint desired to be applied to a surface to be painted can be determined by coating the topcoat paint on at least a portion of a surface of the transparent or translucent substrate, providing a grayscale series of patches between the paint coating and the surface to be painted, and observing the appearance of the paint coating where patches are beneath the coating and where patches are not beneath the coating.

7 Claims, 4 Drawing Sheets

(56) References Cited

U.S. PATENT DOCUMENTS

| | | | |
|---|---|---|---|
| 2002/0092221 A1* | 7/2002 | DaRif et al. | 40/674 |
| 2004/0181981 A1* | 9/2004 | DaRif et al. | 40/124.01 |
| 2006/0121230 A1* | 6/2006 | Neerhout | 428/40.1 |
| 2006/0121231 A1* | 6/2006 | Lerner et al. | 428/40.1 |
| 2006/0257609 A1* | 11/2006 | Winter | 428/40.1 |
| 2007/0122612 A1* | 5/2007 | Young et al. | 428/343 |
| 2008/0014561 A1* | 1/2008 | Boney | 434/103 |
| 2011/0177486 A1* | 7/2011 | Boney | 434/365 |

* cited by examiner

PAINT SWATCH TEST DEVICE AND METHOD

FIELD OF THE INVENTION

This relates to the color swatches that are used to visually judge the ability of a paint to meet the color requirements of the user, specifically to paint swatch test devices which are especially well suited for the user to conveniently produce test swatches using topcoat paints, stains or other surface coatings chosen by the user which enable the user to visually evaluate, in addition to color, the hiding power of the chosen topcoat paint when the paint is used alone and when it is used in conjunction with neutral white and neutral gray primers having various degrees of light reflectance.

BACKGROUND OF THE INVENTION

Mass-produced paint color swatches, also known as color chips or color cards, which are commonly supplied by paint manufacturers, are widely used to visually judge the suitability of paint colors being considered for painting projects involving walls, ceilings, floors, fences, cabinets, etc. The number of different colors represented by mass-produced paint color swatches is limited to a group of colors chosen by the paint manufacturer to balance the manufacturer's need to have an economical and manageable inventory of paint color swatches against the user's desire to have the widest variety of color swatches from which to choose a color that meets each user's unique decorating needs. Mass-produced paint color swatches are generally made using fast-drying lacquers or inks which are designed to be applied to opaque color swatch substrates, usually heavy white paper or cardstock, using high speed coating or printing machinery. Except for color, such lacquers and inks are compositionally and functionally very different from the commercially available paints which are used to decorate and protect the surfaces found in the everyday environment (walls, ceilings, floors, shelves, cabinets, doors, etc.). Mass-produced paint color swatches enable the user to review and choose colors which are available from a specific group of paint products which are formulated to deliver the mass-produced swatch colors when colored with color pigment concentrates known commercially as tinters or colorants. In other words, mass-produced swatches are ordinarily not designed or intended to be used to judge the ability of any paint characteristic, other than color, to meet user needs. Notably, ordinary mass-produced paint color swatches are not designed or intended to be used to judge the very important characteristic of hiding power of the actual paints used for coating painting project surfaces (walls, ceilings, floors, shelves, cabinets, doors, etc.). "Hiding power" is commonly defined as a measure of the ability of a paint, stain or other surface coating to visually obscure a substrate surface exhibiting one or more contrasting colors. A paint having high hiding power can be used to reliably obscure substrate colors ranging from pure white to pure black and all colors and shades commonly included in the gamut of colors commercially available in the form of a paint, stain or other surface coating. Paints having high hiding power require thinner and/or fewer coats to obscure a substrate having one or more contrasting colors. Using thinner and/or fewer coats of topcoat paint yields material and time savings which advantageously reduces the cost and the time required to complete a painting project.

Paints containing sufficient amounts of inorganic or mineral pigments like titanium dioxide, iron oxide and carbon black are known to have high hiding power because of their ability to scatter and/or absorb light of many visible wavelengths. Conversely, it is well known by those skilled in the art that paints colored primarily with organic pigments having a high level of color purity, saturation or chroma do not scatter light efficiently and consequently tend to be semitransparent, have poor hiding power and generally require the application of multiple coats to obscure a substrate surface color or colors. Because the poor hiding power associated with high chroma paints is commonly not recognized by the general public including the ordinary paint user, the color achieved on the user's painting project surface (walls, ceilings, floors, shelves, cabinets, doors, etc.) often does not match the color exhibited by the mass-produced swatch because the original color of the project's surface partially shows through one or more coats of a characteristically low hiding power high chroma paint. The show-through of the original surface color visually alters or adulterates the topcoat paint's color to the point where the topcoat paint's color appears to be noticeably different from that color expected on the basis of viewing the corresponding mass-produced paint color swatch which is necessarily designed to represent the topcoat paint's color when no show-through of various unknown substrate colors occurs.

U.S. Pat. Nos. 4,546,007 and 5,700,515 teach the use of high hiding power neutral white and gray primer coatings over a colored surface prior to topcoating with a low hiding power high chroma paint to eliminate or significantly reduce visual show-through of the original surface color. These patents further teach that the most effective shade of gray chosen for the primer to be used with a specific topcoat color is determined by mathematically comparing spectral reflectance curves for a specific topcoat color with the curves for a series of high hiding power white and gray primers having a range of light reflectance or CIELab lightness/darkness levels. Spectral reflectance curves are measured using sophisticated laboratory spectrophotometer instruments like those described in U.S. Pat. No. 5,700,515. Access to such spectrophotometers and the mathematical knowledge required to use spectral reflectance curves to identify the most effective shade of white or gray primer to prevent substrate color show-through are well beyond the capabilities of the ordinary paint user. Additionally, it is counterintuitive to most paint users that the use of a neutral white or gray primer could effectively improve the hiding power of a high chroma topcoat. The ordinary paint user generally assumes that it would be impossible for a "colorless" neutral white or neutral gray primer to improve the hiding power of a vividly colored, high chroma topcoat; vivid colors and neutral colors intuitively seem to be totally incompatible. As a consequence, most ordinary paint users are reluctant to use a white or gray primer under a high chroma topcoat because they are often unaware of the poor hiding power associated with high chroma topcoats and have an intuitive bias against the concept of employing a neutral white or neutral gray color to improve the perceived hiding power of a high chroma topcoat paint.

Thus several advantages of one or more aspects are to provide an easy-to-use device which allows the user to prepare paint color test swatches which provide the user with direct visually perceived color and hiding power information which is beyond the scope of the commonly available mass-produced paint color swatches known as paint "color chips" or "color cards".

SUMMARY OF THE INVENTION

A paint swatch test device comprising a transparent or translucent substrate and a plurality of different primer coating patches on the substrate, said plurality of different primer coating patches being selected from the group consisting of patches of white and gray primer coatings. Methods for determining the color suitability and/or hiding power of a topcoat paint desired to be applied to a preselected surface are also provided.

Figure 1:
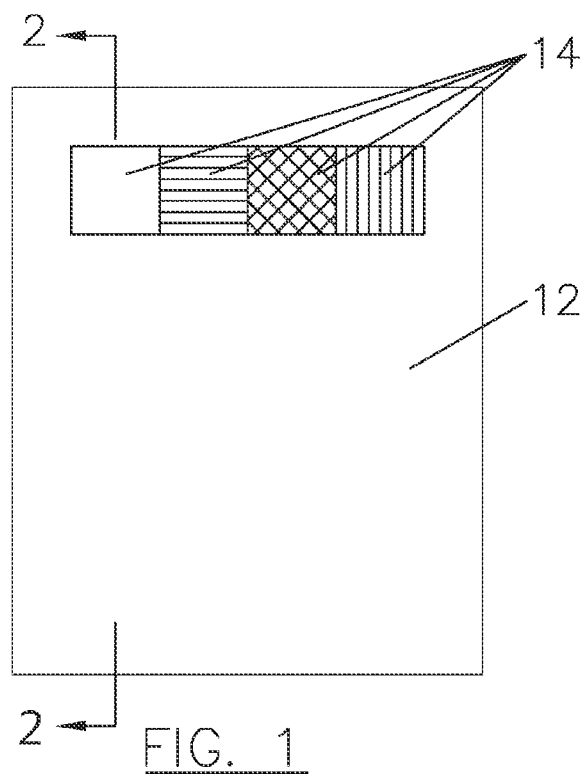
FIG. 1 is a top or plan view of a paint swatch test device according to the invention.

In the drawings, the following reference numerals are used.
12 swatch substrate or substrate
12CA portion of the swatch substrate which has been separated or physically cut away after being coated with test paint
14 primer coating patches or primer patches
16 releasable, repositionable pressure sensitive adhesive layer
18 release liner or removable paper carrier sheet or carrier sheet
20 coating of test paint or topcoat paint applied to top surface of the paint swatch test device including primer patches; the topcoat
20CA physically separated or cut-away portion of the test paint coating adhering to the cut-away portion of the swatch substrate 12CA
22 painting project surface (wall, ceiling, floor, door, table, cabinet, fence, etc.)
24 stand-alone-grayscale substrate
26 swatch substrate border
28 central portion of the swatch substrate surrounded by the swatch substrate border
30 score line separating the swatch substrate border from central portion of the swatch substrate
32 swatch substrate carrier sheet strips
34 score line separating the swatch substrate carrier sheet strips from the central portion of the swatch carrier sheet
36 central portion of the swatch substrate carrier sheet
38 work surface (tabletop, workbench, countertop, etc.)

DETAILED DESCRIPTION OF THE PREFERRED EMBODIMENTS OF THE INVENTION

Figure 8:
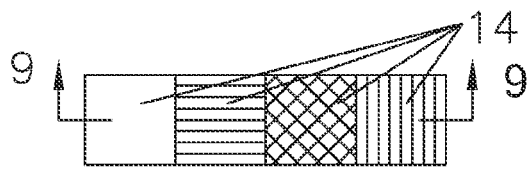
FIG. 8 is a top view of a paint swatch test device which is a stand-alone series of four primer patches on a substrate.
Figure 9:
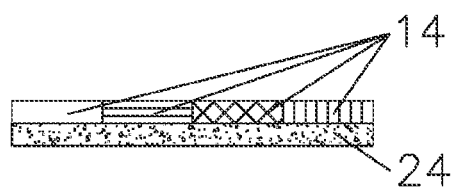
FIG. 9 is a cross-sectional view taken along line 9-9 of FIG. 8.

As used herein, clear means transparent. With reference to FIG. 1, there is shown a paint swatch test device comprising a transparent or translucent substrate 12 and a plurality of different primer coating patches 14 on or coated on the substrate 12. Four different patches are shown; preferably there are, or are at least, 2, 3, 4, 5, 6, 7, 8, 9, or 10 patches, all different from each other. Each patch is of a white or gray primer coating, preferably a neutral or substantially neutral white primer coating and preferably a neutral or substantially neutral gray primer coating. Each patch is preferably opaque. Substrate 12 is preferably a sheet of polymeric material or film, less preferably paper, waxed paper, or other transparent or translucent material. Substrate 12 is preferably colorless or substantially colorless and is preferably sufficiently transparent or translucent so that enough color can be seen through the substrate to permit a user to effectively practice the invention described herein. The plurality of different primer coating patches 14 can cover the entire front or back surface of the substrate, as shown in FIGS. 8-9, or can cover no more than 5, 10, 15, 20, 25, 30, 35, 40, 45, 50, 60, 70, 80 or 90, percent of the front or back surface of the substrate or can cover at least 40, 50, 60, 70, 80, 85, 90, 95, 97, 98 or 99 percent of the front or back surface of the substrate.

Figure 2:
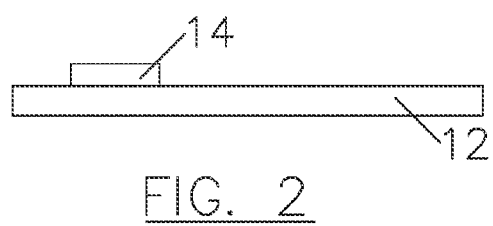
FIG. 2 is a schematic cross-sectional view taken along line 2-2 of FIG. 1, but without cross-hatching. This Figure and subsequent Figures are not to scale (thicknesses are generally exaggerated) and do not have full cross-hatching, so the invention can be more easily seen and understood.
Figure 3:
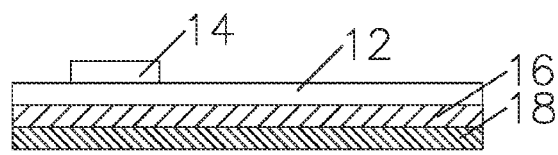
FIG. 3 is like FIG. 2 with a repositionable pressure sensitive adhesive layer 16 and a carrier sheet 18.
Figure 4:
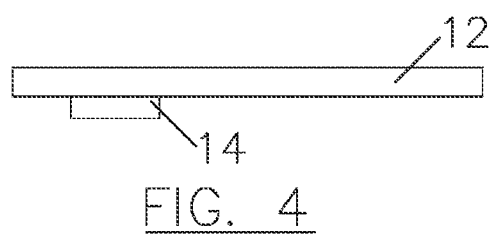
FIG. 4 is a cross-sectional view like FIG. 2, but with primer patches on the bottom surface of the device; layers 16 and 18 can be provided on the bottom of FIG. 4 with patch 14 between layer 16 and substrate 12.

FIG. 1 is a top view of a paint swatch test device showing a grayscale series of four adjacent high hiding power primer patches or primer coating patches 14 each having a different light/darkness CIELab Value ranging from neutral white to a dark neutral gray located at the upper end of said device. The primer patch 14 series has the appearance of a four step grayscale having stepwise increments of light reflectance levels or values. FIG. 2 is a cross-sectional side view of the device of FIG. 1 showing the leftmost primer patch applied to the top surface of the swatch substrate 12 which consists of a transparent or translucent thin sheet of paint-receptive material which forms the base of the paint swatch test device. FIG. 4 is the same as FIG. 2 except the primer patches 14 are applied to the underside of swatch substrate 12. FIG. 3 is like FIG. 2 showing the leftmost primer patch 14 applied to the top surface of swatch substrate 12. As shown in FIG. 3, substrate 12 is preferably attached to a removable supporting carrier sheet or release liner 18 (of, for example, paper, heavy paper, polymeric film, or other release liner material as known in the art) by an intermediate layer of releasable and repositionable pressure sensitive adhesive 16, which is preferably transparent, translucent, and/or colorless, and which is permanently adhered to substrate 12. Preferred releaseable, repositionable pressure sensitive adhesives are as are known in the art. Adhesive layer 16 permits the substrate 12 to be repeatedly repositioned over and temporarily adhered to different areas of the painting project surface.

In accordance with the configuration shown in FIG. 3, substrate 12 is a plastic or polymeric sheet or film consisting of a twelve inch by 24 inch, 0.0035 inch thick clear and colorless flexible polyvinyl chloride (PVC) film which is coated on the bottom surface with a layer of releaseable, repositionable pressure sensitive adhesive 16 which provides temporary attachment to a polycoated paper carrier sheet or release liner 18 which enhances physical robustness of substrate 12 during manufacturing, shipping and test paint application. The top surface of the PVC sheet swatch substrate 12 is very finely textured which promotes wetting and adhesion of paints applied to this surface. This texture imparts a frosty or translucent appearance to swatch substrate 12 which blurs the visual perception of details on surfaces over which swatch substrate 12 is positioned but does not materially alter the visual color appearance of said surface and consequently such a finely textured clear plastic sheet is considered here to be translucent. Translucency may also be imparted by the inclusion of colorless particulate pigments such as crystalline or amorphous silica into the plastic sheet material itself. Part No. 3-5424-10004 (FRCLR VINYL 48* 64 90) available from Ritrama, Inc., 800 Kasota Ave, Minneapolis, Minn. 55414 is an example of a commercially available plastic sheet 12—adhesive 16—polycoated paper carrier sheet 18 combination which meets these specifications and is suitable. About two inches from the upper edge of substrate 12 is a series of adjacent white and gray primer patches 14 measuring 2 inches by 2.8 inches. The white patch 14 was made by applying Glidden Gripper White Primer No. GL3210-1200 made by ICI Paints, Strongsville, Ohio 44136 using a 0.5 inch diameter aluminum rod with 0.0035 inch thick shims between the rod and PVC sheet swatch substrate 12 surface to manually spread a quantity of primer sufficient to cover the 2 inch by 2.8 inch primer patch 14 area. Paper masking tape was used to prevent excess primer from covering other parts of the plastic sheet 12. Once the wet primer paint was spread out into the appropriate area, the paper masking tape was removed leaving well defined rectangular areas covered by primer patches 14. The darkest gray primer patch 14 was made using the same procedure as for white primer patch 14 but used Glidden Gripper Grey Primer No. GL3250 made by ICI Paints, Strongsville, Ohio 44136. Remaining primer patches 14 were also made using the same procedure as for white primer patch 14 but used mixtures of the Glidden Gripper Grey Primer and the Glidden Gripper White Primer in the weight ratios of 1:2 and 2:1 respectively to provide intermediate shades of gray. Each of the four primer patches had different light reflectance values estimated, in CIELab lightness/darkness Value terminology, to be $L^*$=95, 80, 67 and 55. Estimates were made by visual comparison of dried primer patches 14 to the neutral color patches on a GretagMacbeth ColorChecker color rendition chart supplied by GretagMacbeth, New Windsor, N.Y. 12553. Primer patches 14 are of sufficient hiding power to visually obscure both pure white and black painted surfaces. Other numbers of primer patches can be used, such as 2, 3, 5, 6, 7, 8, 9, 10, etc. with a series of different light reflectance values.

Figure 5:
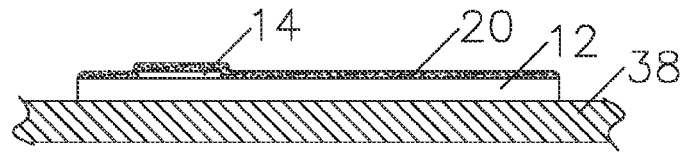
FIG. 5 is like FIG. 2 with test paint applied to the entire top surface of the device which rests on a work surface.

In operation, the paint swatch test device is placed on a firm work surface 38 like a tabletop, workbench or countertop (FIG. 5) and secured at the corners and/or edges, if desired, with masking tape or the like. The work surface may be protected from excess test paint with newspaper or other disposable material. Alternatively, the paint swatch test device may be temporarily attached to a wall or other upright work surface 38 with clear cellophane tape, masking tape, pins, clips, etc. The paint chosen for evaluation is applied using any suitable paint application tool including brushes, paint rollers, paint pads, sponges, sprayers, etc. and preferably in a manner (tool type, tool speed, pressure, number of strokes per unit area, etc.) which is like that which will be used to paint project surface 22, which is a pre-selected surface. Paint is applied to completely and uniformly coat the paint swatch test device surface in accordance with the paint manufacturer's instructions; alternatively only portions of the substrate 12 and patches 14 may be painted.

After allowing the paint to dry for a period of time recommended by the paint manufacturer, additional coats of paint may be applied to all or portions of the device (allowing sufficient drying time between coats) if desired to allow the user to judge the effect of multiple coats on the perceived color and hiding power of the paint being evaluated.

Figure 6:
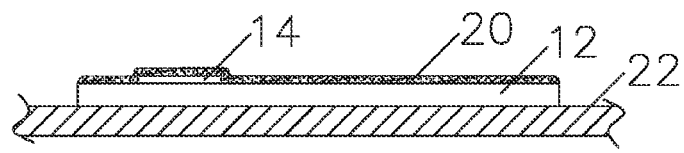
FIG. 6 is like FIG. 5 but shows the painted device positioned over a painting project surface (wall, shelf, floor, door, table, etc.).

As shown in FIG. 6, once the painted paint swatch test device has dried in accordance with the paint manufacture's recommendations, it is positioned onto painting project surface 22 (wall, ceiling, floor, fence, door, table, etc.) and held in place, if desired, with adhesive tape, pins, etc. or by adhesive layer 16, for viewing by the user. Because a clear or translucent and colorless swatch substrate 12 is used to fabricate the device, test paint topcoats of low hiding power will allow the color of painting project surface 22 to show through test topcoat 20 and, if painting project surface 22 color is different than that of test paint topcoat 20, it will alter the visually perceived color of test paint topcoat 20, i.e. the color of painting project surface 22 will not have been completely obscured. This closely simulates the visual outcome of applying topcoat paint 20 directly to painting project surface 22; low hiding topcoat paints allow the color of project painting surface 22 to show through and alter the visually perceived color of topcoat paint 20.

Figure 7:
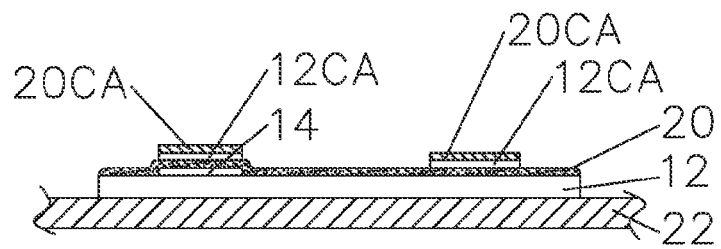
FIG. 7 is like FIG. 6 but with portions of the topcoated, non-primed area of the paint swatch test device physically separated or cut away from the device and repositioned over areas of the remaining portion of the topcoated paint swatch test device.

The user can also conveniently judge the improvement in hiding expected from applying multiple layers of topcoat test paint 20 by simply using a scissors to separate or cut away a portion 12CA+20CA, for example a three by three inch square of the painted device which is free of primer 14 and positioning one, two, three or more cut-away portions 12CA+20CA over a primer-free area of the remaining device which is already positioned over painting project surface 22 (FIG. 7). Portions 12CA+20CA can be separated by other means; for example, perforations or score lines or cut lines can be provided so the portions can be torn away from the rest of the substrate. The effect of additional layers of topcoat test paint 20 on the ability to hide or obscure the painting project surface 22 color can be visualized by layering on additional cut-away sections of the topcoated primer-free device 12CA+20CA. The user can also easily evaluate the effect of white and gray primers of different light reflectance values on test paint 20 hiding power by simply viewing those sections of the device where the primer patches 14 were located and/or by placing one, two, three or more portions 12CA+20CA thereover (see left side of FIG. 7). The user notes if any primer patch 14 shade improves the visual color match between the mass-produced paint color swatch and the perceived color of test paint 20 applied over primer patch 14 area. Although generally unexpected by the average paint user, vividly colored high chroma paints will generally show a perceptible improvement in hiding power and color fidelity when applied over a particular shade of gray primer 14. The primer hiding improvement information thusly obtained would be communicated to a paint department technician by showing him or her the painted test swatch device who would then be able to match the gray shade of the chosen primer patch 14 to any of the numerous high hiding gray primers supplied by typical paint manufactures.

Figure 10:
FIG. 10 is a cross-sectional side view of a paint swatch test device without primer patches that has had the entire top surface coated with a test paint.

FIG. 8 is a top view of a stand-alone series of four (but any number can be used) high hiding power neutral white and neutral gray primer patches 14 having different light/darkness CIELab Values ranging from neutral white to dark neutral gray (as described herein) adhering to a substrate or carrier sheet 24 (which can be the same as substrate 12 or can be made of any material, such as opaque, substantially opaque, transparent or translucent, preferably paper or plastic, such as described for substrate 12 above) which is physically separate from swatch substrate 12. Alternatively, the patches 14 of FIG. 8 can be attached not to substrate 24 but to a release liner 18 by a releasable, repositionable pressure sensitive adhesive layer 16 (in this case, the patches 14 are on the release liner 18) so that the patches of FIG. 8 can be repositionably attached to a surface 22 or to the underside of the device of FIG. 10. FIG. 9 is a cross-sectional view of the stand-alone primer patch series of FIG. 8 showing the four primer patches 14 adhering to carrier sheet 24. FIG. 10 is a cross-sectional side view of swatch substrate 12 of FIG. 2 constructed without primer patches 14 which has had the entire top surface coated with the test paint 20 under evaluation.

Figure 11:
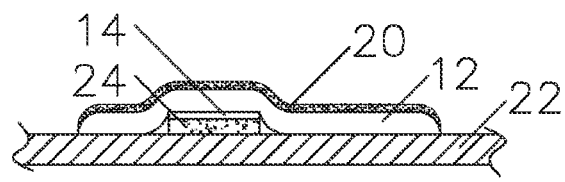
FIG. 11 is a cross-sectional side view of the topcoated device of FIG. 10 showing the stand-alone primer patch series of FIG. 9 positioned between the bottom surface of the clear swatch substrate of FIG. 10 and a painting project surface.

FIG. 11 is a cross-sectional side view of the combination of the topcoated swatch substrate 12 of FIG. 10 with the stand-alone primer patch series of FIG. 8 positioned between the bottom surface of substrate 12 of FIG. 10 and painting project surface 22. Once the topcoated device of FIG. 10 is positioned as in FIG. 11, the user notes if the hiding power of test paint 20 positioned over one of the primer patches 14 that make up the stand-alone series of FIG. 8 is improved. If an improvement is noted, the information thusly obtained can be communicated to a paint department technician by showing him/her the painted test swatch device and stand-alone primer patch 14 series of FIG. 8. The technician would then be able to match the gray shade of the chosen primer patch 14 to any of the numerous high hiding white and gray primers supplied by typical paint manufactures. The advantage of the stand-alone primer patch 14 series of FIG. 8 is that the need to have a grayscale primer patch 14 series on each paint swatch test device (see FIG. 1) is eliminated which simplifies manufacturing and reduces cost; a single stand-alone primer patch 14 series of FIG. 8 could be reused under numerous paint swatch test devices. Additionally, one could use the stand-alone primer patch 14 series of FIG. 8 to visually assess the potential for improving the perceived hiding power of a test topcoat 20 by direct topcoat 20 application on the device of FIG. 8 without the need to apply topcoat 20 to an entire paint swatch test device as in FIG. 1.

Figure 12:
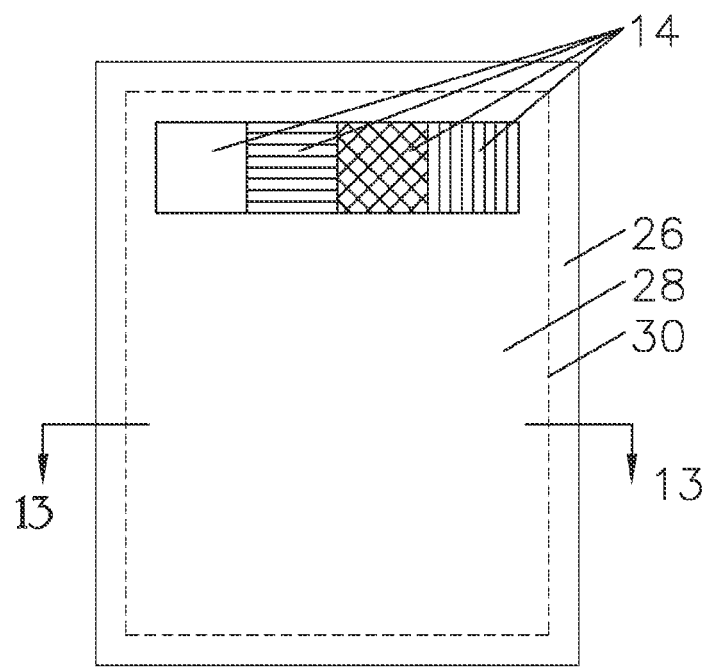
FIG. 12 is a top view of the device of FIG. 3 showing a separate outer border area.
Figure 13:
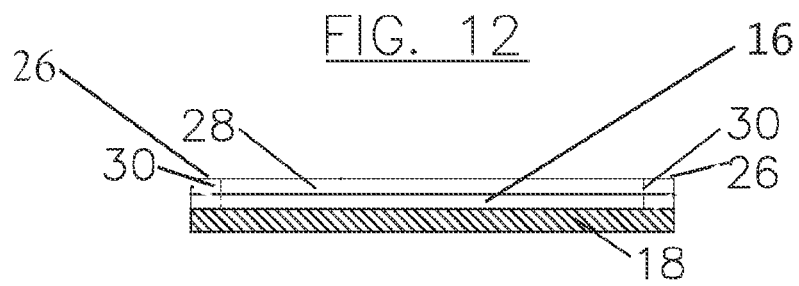
FIG. 13 is a cross-sectional view taken along line 13-13 of FIG. 12, but without full cross-hatching.

In another embodiment shown in FIGS. 12 and 13, swatch substrate 12 and its layer of pressure sensitive adhesive 16 is provided with a score line 30 in a rectangular pattern as shown which is typically several inches less in length and width than are the outside dimensions of the paint swatch test device thereby creating a swatch substrate border 26 one or more inches wide which surrounds a central portion 28 of swatch substrate 12. Score line 30 is a zone or line where the material of substrate 12 is partially or completely cut through or provided with perforations or weakened areas or fibers, etc. Other score lines as known in the art can be used. Score line 30 physically separates the outer edges of the central portion 28 of swatch substrate 12 from its outer border 26. Score line 30 allows central portion 28 of swatch substrate 12 to be removed by manually peeling it away from carrier sheet 18 allowing it to be subsequently repositioned onto painting project surface 22. Controlled depth cuts in such sheet 12—adhesive 16—polycoated paper carrier sheet 18 combination materials are commonly accomplished using "cutting plotters" as are available from Graphtec America, Inc. (www.graphtecamerica.com). Cutting plotters are ordinarily used to cut letters, numbers, logos, etc. from plastic film backed with pressure sensitive adhesive which are used to fabricate signs, banners, etc. Other die cutting methods known to those skilled in the art may be employed.

During application of test paint 20, paint is applied to overlap score line 30 but not to reach the outside edge of the paint swatch test device. After the topcoat of test paint 20 has dried, central portion 28 of paint swatch substrate 12 is manually peeled away from carrier sheet 18 and positioned over painting project surface 22 for viewing. The partially painted outer border 26 remains on carrier sheet 18 where it protected the work surface from surplus test paint 20 during the application process. Coating a portion of swatch substrate border 26 with test paint 20 ensures that the edges of central portion 28 of the device are coated uniformly while simultaneously protecting work surface 38 from being soiled by excess paint 20.

Figure 14:
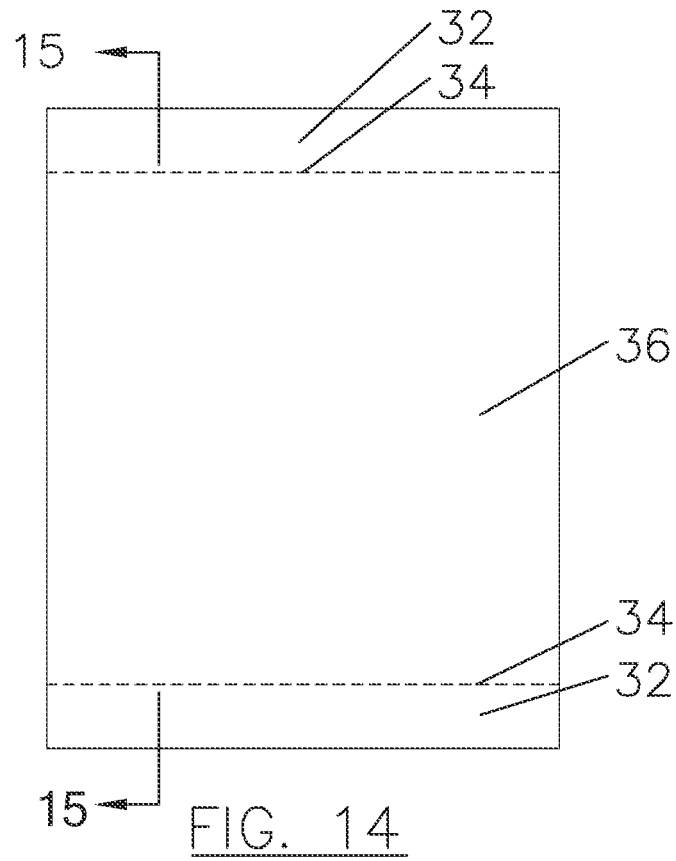
FIG. 14 is a bottom view of the device of FIG. 3 showing strips of the release liner or carrier sheet 18 separatable from the central portion of the carrier sheet.
Figure 15:
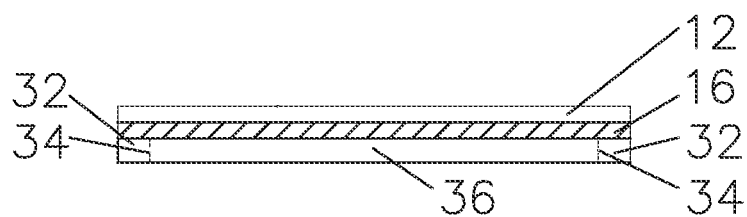
FIG. 15 is a cross-sectional view taken along line 15-15 of FIG. 14, but without full cross-hatching.
Figure 16:
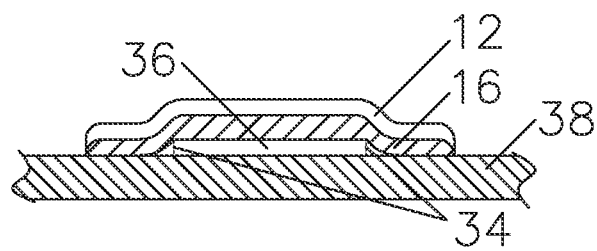
FIG. 16 is like FIG. 15 with the carrier sheet strips removed and the remaining portion of the device placed over a work surface.

FIG. 14 is a bottom view of the device of FIG. 3 which shows strips 32 of the carrier sheet 18 created by score lines 34 through the carrier sheet 18. In this embodiment, swatch substrate 12 (with patches 14 coated thereon) and pressure sensitive adhesive layer 16 remain unscored along score lines 34. FIG. 15 is a cross-sectional side view of the device of FIG. 14. In use, carrier sheet strips 32 are removed to expose a portion of repositionable pressure sensitive adhesive 16 which can then be used to anchor the device to work surface 38. FIG. 16 is like FIG. 15 with the carrier sheet strips 32 removed and the remaining portion of the device placed over a work surface 38 allowing the exposed portion of adhesive 16 to contact work surface 38 and temporarily anchor the paint swatch test device to work surface 38.

Alternate embodiments can make use of other thin transparent or translucent and colorless substrate 12 materials in the thickness range of about 0.001 to 0.012 or 0.02 inches with planar dimensions ranging from about six by six inches to about 36 by 36 inches. Preferred dimensions are in the range of 0.002 to 0.006 inches in thickness with planar dimensions ranging from about 12 by 12 inches to 26 by 26 inches. Substrate 12 can be film or sheet, flexible or bendable or stiff or rigid. The paint swatch test device can be square, rectangular, round or other shape as desired. Other shapes include decorative geometrical or functional shapes such as alphanumeric characters. Other suitable plastic film or sheet types include those which are receptive to paints, provide good adhesion to the test paint, are not chemically or physically attacked by the paint and are dimensionally stable. Appropriate forms and grades of polyvinyl chloride, polyester, polyethylene, polyethylene terephthalate (PET) and polypropylene are examples of polymeric film or sheet materials which are suitable from performance and cost perspectives. Furthermore, substrate 12 may be coated with a transparent or translucent and/or colorless paint primer or other coating to modify the adhesion, absorption or texture properties of the surface of substrate 12 as desired. Other embodiments can use any number of primer patches 14 having different light reflectance values as measured by CIELab lightness/darkness Values or other similar methodologies for measuring and characterizing the light reflectance properties of a surface. The CIELab lightness/darkness values of the primer patch 14 series can range from about $L^*=95$ to $L^*=15$, preferably $L^*=95, 90, 85, 80, 75, 70, 65, 60, 55, 50, 45, 40, 35, 30, 25, 20,$ and/or 15. The shape of the primer patches may be square, rectangular, circular or other shape as is desired. Likewise, the size of the primer patches may vary as desired within the planar dimensions of the paint swatch test device. Primer patches 14 may be deposited or coated onto the top surface of substrate 12 using application methods such as roll coating, rotogravure, screen printing, lithography, or other processes know in the art. The same or similar application and printing methods can be used to prepare the stand-alone primer patch 14 series of FIG. 8. The primer coating of patch 14 may consist of paint, ink, lacquer or other pigmented film forming compositions compatible with the chosen application method and which produce a paint-receptive and adherent coating on the substrate 12 or on the carrier sheet 24 of FIG. 8 and that has the desired CIELab lightness/darkness Values and has hiding power sufficient to obscure painting project surface colors ranging from pure white to pure black and all colors and shades commonly included in the gamut of colors available in the form of commonly available paints, stains or other surface coatings; this hiding power may be referred to as high hiding power. Substrate 24 can optionally be the same as substrate 12.

Although the above described embodiments of the invention constitute the preferred embodiments, it should be understood that modifications can be made thereto without departing from the scope of the invention as set forth in the appended claims.

What is claimed is:

1. A method for determining the color suitability and/or hiding power of a topcoat paint desired to be applied to a pre-selected surface, the method comprising the steps of:
   a) coating the topcoat paint on or adjacent at least a portion of a surface of a transparent or translucent first substrate;
   b) positioning the first substrate on or adjacent the pre-selected surface, wherein a plurality of different primer coating patches are provided between the paint coating and the pre-selected surface, and wherein the plurality of different primer coating patches are selected from the group consisting of patches of white and gray primer coatings; and
   c) observing the appearance of the paint coating where the primer coating patches are between the paint coating and the pre-selected surface and where the primer coating patches are not between the paint coating and the pre-selected surface.

2. The method of claim 1, wherein the primer coating patches are located between the paint coating and the first substrate.

3. The method of claim 1, wherein the primer coating patches are located between the first substrate and the pre-selected surface.

4. The method of claim 3, wherein the primer coating patches are adhered on a bottom surface of the first substrate.

5. The method of claim 3, wherein the primer coating patches are provided on a second substrate and the second substrate is positioned between the first substrate and the pre-selected surface.

6. The method of claim 5, wherein the second substrate is opaque and wherein the primer coating patches are located between the paint coating and the second substrate.

7. The method of claim 1, further comprising separating from the first substrate a portion of the first substrate which has been coated with topcoat paint and which does not contain any portion of the primer coating patches, and positioning said separated portion over all or a part of one or more of the primer coating patches, and/or over a portion of the paint coating underneath which there are no primer coating patches.

* * * * *